United States Patent
Seo et al.

(10) Patent No.: US 9,536,553 B1
(45) Date of Patent: Jan. 3, 2017

(54) DECOUPLED DISTURBANCE ESTIMATOR IN DUAL-STAGE SERVO CONTROLLER WITH LOOP-SHAPING FILTER

(71) Applicant: Seagate Technology LLC, Cupertino, CA (US)

(72) Inventors: Sangbo Seo, Yongin-si (KR); Yunsik Ju, Suwon-si (KR); Minsu Jang, Suwon-si (KR); Jiwon Cha, Yongin-si (KR)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/019,033

(22) Filed: Feb. 9, 2016

(51) Int. Cl.
G11B 5/55 (2006.01)

(52) U.S. Cl.
CPC ..................... G11B 5/556 (2013.01)

(58) Field of Classification Search
USPC ....................................................... 360/78.05
See application file for complete search history.

(56) References Cited

U.S. PATENT DOCUMENTS

| | | | | |
|---|---|---|---|---|
| 6,493,172 B1* | 12/2002 | Morris | ................. | G11B 5/5552 360/78.12 |
| 6,563,665 B1 | 5/2003 | Ell | | |
| 6,898,039 B2* | 5/2005 | Kobayashi | ........... | G11B 5/5526 360/78.09 |
| 7,019,938 B2* | 3/2006 | Miyata | ................. | G11B 21/083 360/78.05 |
| 7,206,159 B2* | 4/2007 | White | ..................... | G11B 5/02 360/75 |
| 7,835,104 B2 | 11/2010 | Yamashita et al. | | |
| 8,363,350 B2* | 1/2013 | Matsuzawa | .......... | G11B 5/5552 360/78.05 |
| 9,001,454 B1* | 4/2015 | Kim | ..................... | G11B 5/5547 360/78.04 |
| 9,053,726 B1 | 6/2015 | Kim et al. | | |
| 9,202,496 B2* | 12/2015 | Supino | ..................... | G11B 5/58 |

OTHER PUBLICATIONS

Oct. 17, 2012, Chen et al., "Decoupled Disturbance Observers for Dual-Input-Single-Output Systems with Application to Vibration Rejection in Dual-Stage Hard Disk Drives", ASME 2012 $5^{th}$ Annual Dynamic Systems and Control Conference, Oct. 17-19, 2012, pp. 1-10.

Jul. 24, 2005, Kim et al., "Adaptive and Optimal Rejection of Non-Repeatable Disturbance in Hard Disk Drives", Proceedings of the 2005 IEEE/ASME International Conference on Advanced Intelligent Mechatronics, Jul. 24-28, 2005, pp. 1-6.

Jun. 2004, Messner et al., "Design of Adaptive Feedforward Controllers Using Internal Model Equivalence", Proceedings of the American Control Conferences, Jun. 1994, pp. 1619-1623.

* cited by examiner

Primary Examiner — Wayne Young
Assistant Examiner — James L Habermehl
(74) Attorney, Agent, or Firm — Hollingsworth Davis, LLC

(57) ABSTRACT

First and second controllers output respective first and second control signals for first and second plants that respectively correspond to the stages of an actuator. An inverse model of the first plant used to determine a decoupled output of the second plant from a combined output of the first and second plants. A disturbance estimate is subtracted from the second control signal to obtain a disturbance-corrected output. A loop-shaping filter is used between the disturbance corrected output and the second plant.

20 Claims, 8 Drawing Sheets

DECOUPLED DISTURBANCE ESTIMATOR IN DUAL-STAGE SERVO CONTROLLER WITH LOOP-SHAPING FILTER

SUMMARY

Various embodiments described herein are generally directed to a decoupled disturbance estimator in dual-stage servo controller with loop-shaping filter. In one embodiment, first and second controllers output respective first and second control signals for first and second plants that respectively correspond to the stages of an actuator. An inverse model of the first plant used to determine a decoupled output of the second plant from a combined output of the first and second plants. A disturbance estimate is subtracted from the second control signal to obtain a disturbance-corrected output. A loop-shaping filter is used between the disturbance corrected output and the second plant.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
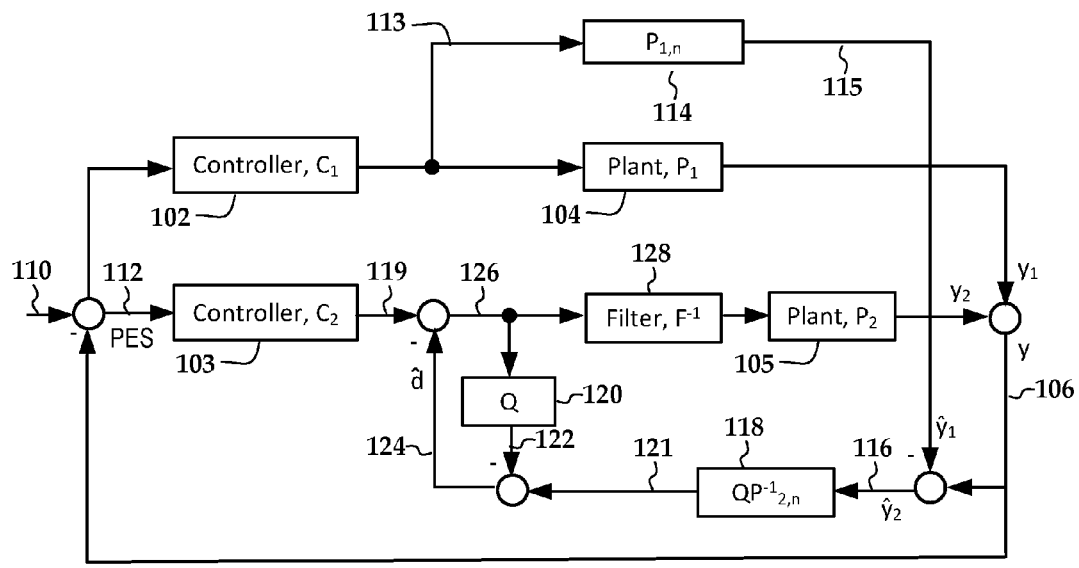
FIG. 1 is a block diagram of a servo control system according to an example embodiment.

Some hard drives, such as hard drives used in portable devices, are designed with the assumption that significant mechanical disturbance (e.g., shock, vibration) of the drive may occur while the hard drive is operating. As such, the hard drives may include measures to compensate for shock and vibration during operation. However, even in a fixed installation (e.g., desktop, server), shock and vibration may be present. For example, in a multi-drive configuration such as a disk array, the cooling fans as well as the drives themselves may generate vibrations that may be transmitted between hard drives through the structure in which they are mounted. This vibration can affect, among other things, tracking of the read/write head over the recording media. In other installations (e.g., a tablet or laptop computer), vibration generating components such as speakers, force-feedback devices, etc., may cause similar disturbances that affect a hard drive.

The present disclosure relates generally to methods and apparatuses that compensate for disturbances affecting a closed-loop, hard drive, servo system. Generally, the servo system includes actuators and control circuitry that position a read/write head over tracks of a hard disk recording medium. The read/write head reads servo data recorded on the disk which is used as feedback to set and maintain location.

Due to the increasingly smaller track pitch of modern hard disk drives, such control loops can be susceptible to exogenous disturbances, e.g., shock and vibration applied to the housing of the hard drive. One technique for dealing with disturbance is known as feed-forward compensation. A feed-forward compensator generally operates by measuring vibration (e.g., via an accelerometer or piezoelectric sensor) and using the measurement to form a compensation signal. The compensation signal is combined with an actuator control signal to mitigate the effects of the disturbance.

While feed-forward compensation can be effective, it is not without its drawbacks. For example, the sensors may be susceptible to noise, which can cause erroneous compensation signals to be sent to the actuator. The actuator that moves the read/write head may be frequency limited, e.g., unable to reject measured disturbances above a certain frequency range. In some cases, due to the sensor placement of complexity of the structures, there may be only partial correlation between what the sensors detect and what is being experienced at the read/write head.

Other techniques for dealing with disturbance rejection involve analyzing the position error signals (PES) generated by the read/write head and try to estimate disturbance based on these signals. For example, by looking at a spectrum of the position error signal, some types of disturbances can be identified and compensated for. However, such analysis may be processor intensive, and therefore difficult to implement in a real-time control loop.

The present disclosure describes techniques for estimation of disturbance and position error signal for servo control optimization. The techniques may be used on devices without vibration sensors, may be used in a device where vibration sensors are included but not activated in some modes, and/or used to augment feed-forward servo controllers that use vibration sensors. The proposed architectures are described in the context of hard drive servo control systems, although may be applicable to other control systems.

In reference now to FIG. 1, a block diagram illustrates a servo control system according to an example embodiment. Generally, a first and second controllers 102, 103 provides signals to first and second actuators represented by control plants 104, 105. The combined output of the actuators positions a read/write head over a recording medium, as indicated by position signal 106 (designated y in the figure). This is referred to as a dual-stage controller.

In this example, the first plant 104 may represents a small-motion actuator, such as a piezoelectric microactuator.

The second plant 105 represents a large-motion actuator such as a voice coil motor (VCM). The VCM provides coarse, low-frequency positioning of the read/write head, and the microactuator provides fine, high-frequency positioning of the read/write heads. Generally, the position signal 106 is read from servo marks on the recording medium.

A reference input 110 is a command that drives the read/write head to a particular position. For steady-state operation (e.g., tracking) the reference input 110 is zero. The difference between the position 106 and the reference input 110 is the PES 112. The servo control system attempts to minimize PES in order to accurately read and write data from and to the recording medium.

Because of the fine positioning required of the servo plants 104, 105 and the unpredictability of the environment in which the device is used, some servo control models utilize a disturbance observer. Generally, a disturbance observer attempts to estimate an internal state of the system and compare this to an actual output of the system, in this case the output being the position signal 106. In the illustrated embodiment, the disturbance observer is used to provide compensation for the second plant 105. In order to do this, the position signal 106 needs to be separated into outputs of the first and second plants 104, 105 (designated $y_1$, $y_2$ in the figure). These outputs cannot be measured directly, and so are estimated.

The signal 113 that is input to the first plant 104 is used with a nominal first plant model 114 to provide an estimate 115 of the output of the first plant 104, designated $\hat{y_1}$ in the figure. The estimated output 115 is subtracted from the measured output 106 to decouple the first plant 104, thereby obtaining an estimate 116 ($\hat{y_2}$) of the output of the second plant 105. Stated another way, the estimated output $\hat{y_2}$ of the second plant 105 (VCM) is found by the relation $\hat{y_2} = y - \hat{y_1}$, where $\hat{y_2}$ is the estimated second plant 105 (VCM) output decoupled from the first plant (microactuator) output.

At block 118, the decoupled, estimated output 116 of the second plant 105 is input to an inverse nominal plant model of the second plant 105 and filtered by a Q-filter to obtain signal 121. A disturbance-corrected output 126 of the second controller 103 is also processed by a Q-filter 120, the filtered output 122 being subtracted from the signal 121 to obtain a disturbance estimate 124. The disturbance estimate 124 is subtracted from the output 119 of the second controller 119 to compensate for the estimated disturbance, thereby obtaining the disturbance-corrected output 126.

The disturbance corrected output 126 is further processed by a loop-shaping filter 128 before being input to the second control plant 105. This filter 128 may be configured as a peak filter that provides additional loop shaping at a different center frequency (e.g., a higher frequency) than a cut-off frequency of the Q-filter. This can provide more effective disturbance rejection in environments where multiple modes of disturbance are inserted into the servo control system.

Figure 2:
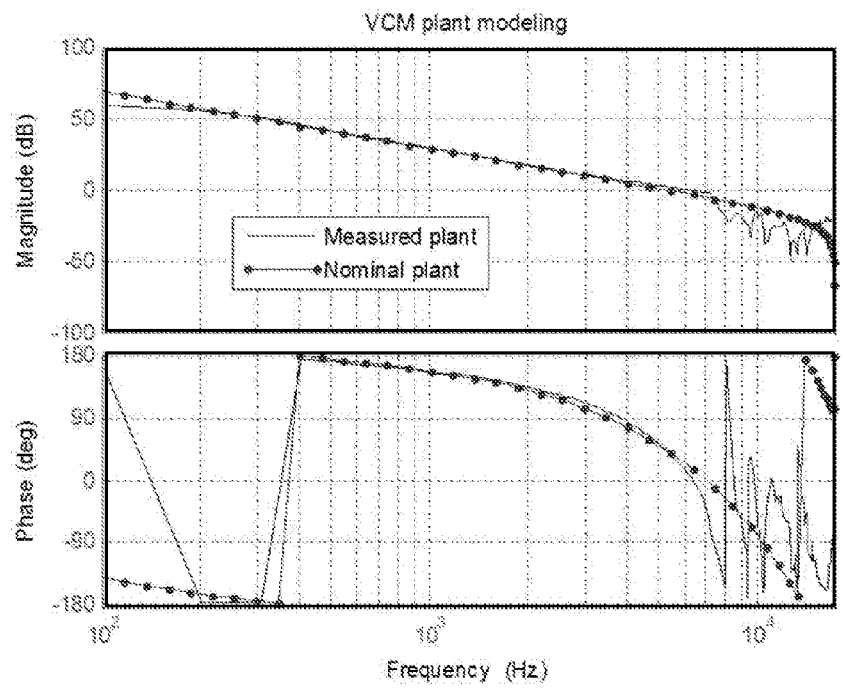
FIG. 2 is a Bode plot illustrating a nominal model of a VCM servo control plant according to an example embodiment.

In FIG. 2, a Bode plot shows the nominal model ($P_{2,n}$) of the second plant 105 according to an example embodiment. Recall that in this example the second plant 105 is a VCM. The plot in FIG. 2 corresponds to the design in Expression [1] below, which is of relative degree −3.

$$P_{2,n}(z) = \frac{0.4657z + 0.4637}{z^4 - 1.987z^3 + .9874z^2} \qquad [1]$$

Figure 3:
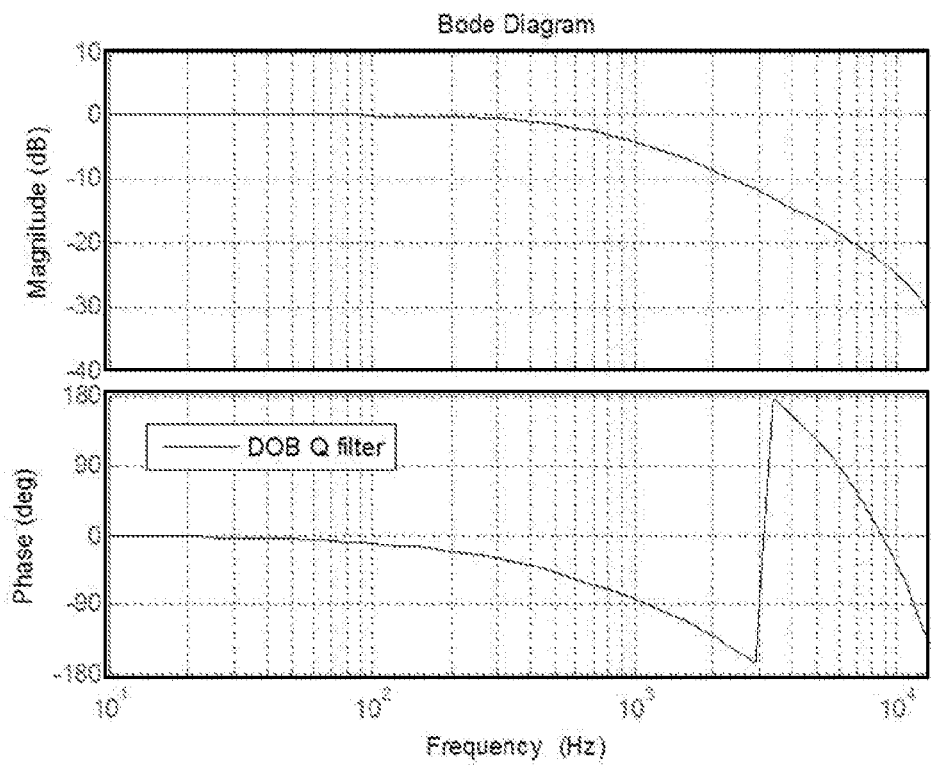
FIG. 3 is a Bode plot illustrating a Q-filter according to an example embodiment.
Figure 4:
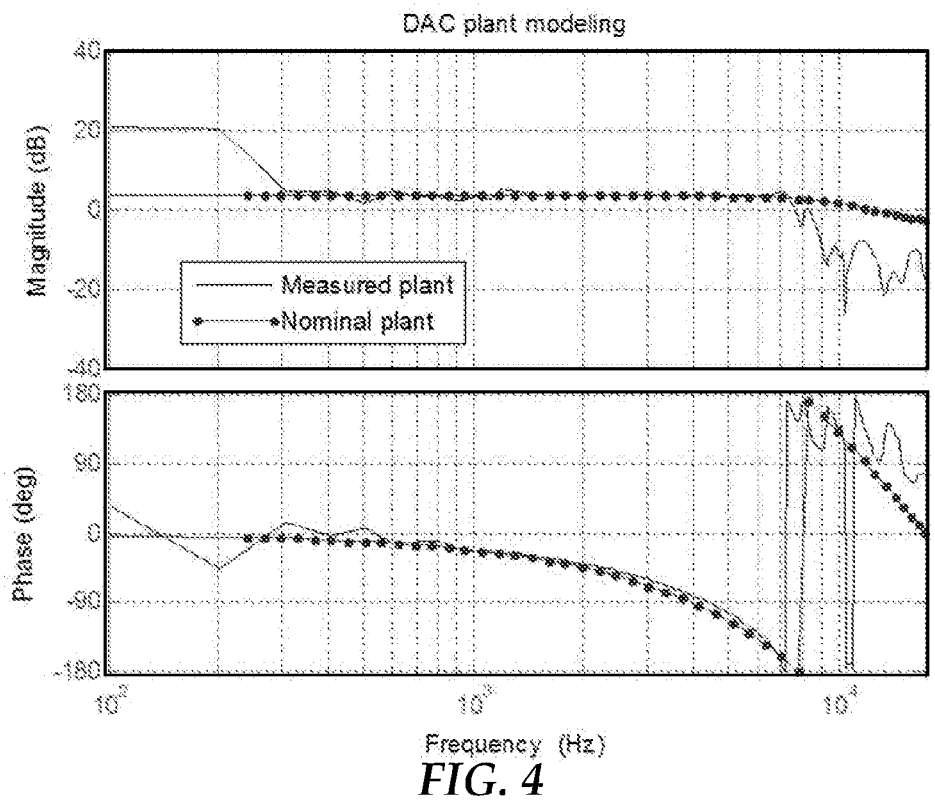
FIG. 4 is a Bode plot illustrating a nominal model of a microactuator servo control plant according to an example embodiment.

In FIG. 3, a Bode plot shows the design of the Q-filter according to an example embodiment, corresponding to Equation [3] below. The Q filter is a first-order low pass filter QLPF with a delay $z^{-3}$ for causality of $P_{2,n}^{-1}$ as shown above. The design of the Q-filter is shown in Expressions [2]-[4] below. In FIG. 4, a Bode plot shows the design of nominal model of the first plant 104 (microactuator) according to an example embodiment, which shown in Expression [5] below.

$$Q_{LPF} = \frac{0.06758z + 0.06758}{z - 0.8648} \qquad [2]$$

$$Q = Q_{LPF} \times z^{-3} = \frac{0.06758z + 0.06758}{z^4 - 0.8648z^3} \qquad [3]$$

$$QP_{2,n}^{-1} = \frac{0.1451z^3 - 0.1433z^2 - 0.1451z + 0.1433}{z^3 + 0.1309z^2 - 0.8612z} \qquad [4]$$

$$P_{1,n} = \frac{1.185z + 0.3893}{z^3 - 0.006692 + 0.0439z} \qquad [5]$$

Figure 5:
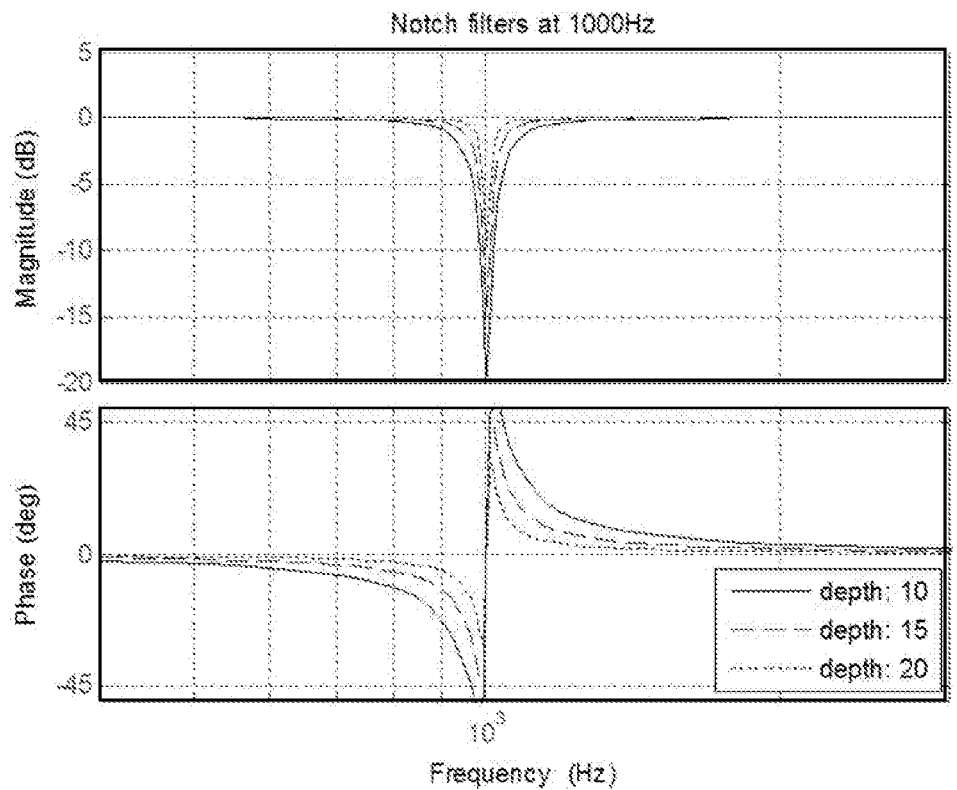
FIG. 5 is a Bode plot illustrating performance of a notch filter according to an example embodiment.
Figure 6:
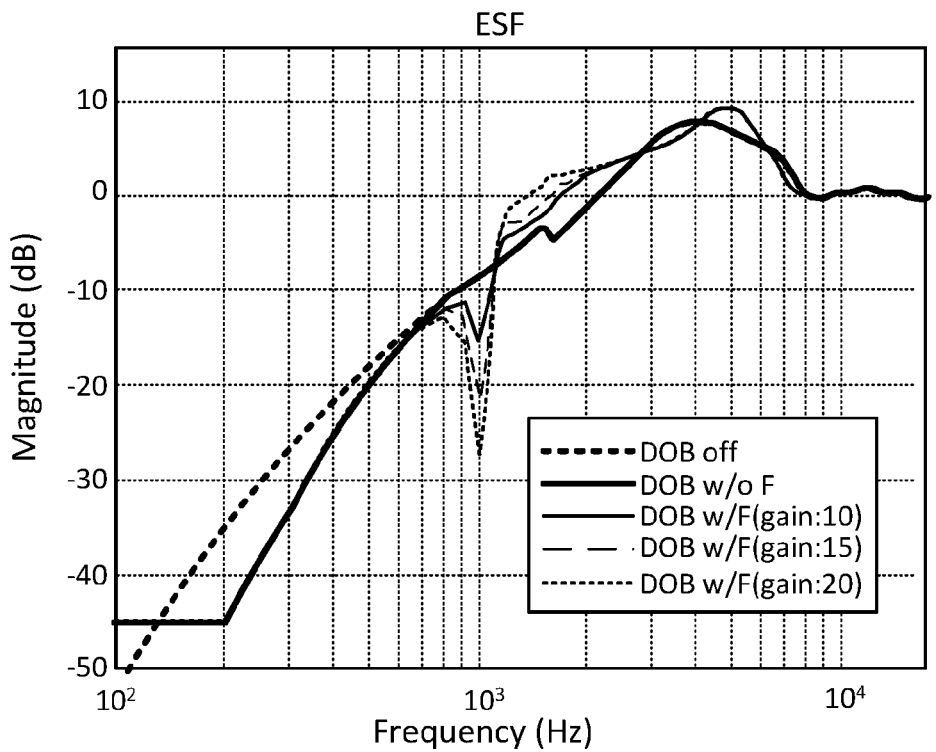
FIG. 6 is a magnitude plot illustrating performance of a servo control system according to an example embodiment.

In FIG. 5 a Bode plot shows the design of the loop-shaping filter 128 according to an example embodiment. Designing the filter generally involves finding a notch filter F(s) in continuous time domain, changing F(s) to F(z) in discrete time domain by matched-pole-zero method, get peak filter $F^{-1}(z)$, and apply the peak filter to the loop in series. The general design of the filter is shown in Expression [6] below as a function of continuous time, where B, is bandwidth, $f_c$ is center frequency, and Q is the depth of the filter. For the example shown in FIG. 5, the center frequency is 1 kHz and the gain is between 10 and 15 dB, as indicated in the plot. The magnitude plot in FIG. 6 shows the error-sensitivity function (ESF) with the disturbance observer (DOB) off, DOB on without filter, and DOB on with filter gain of 10, 15, and 20 dB.

$$F(s) = \frac{s^2 + 2\pi B_w s + (2\pi f_c)^2}{s^2 + 2\pi B_w 10^{(Q/20)} s + (2\pi f_c)^2} \qquad [6]$$

Figure 7:
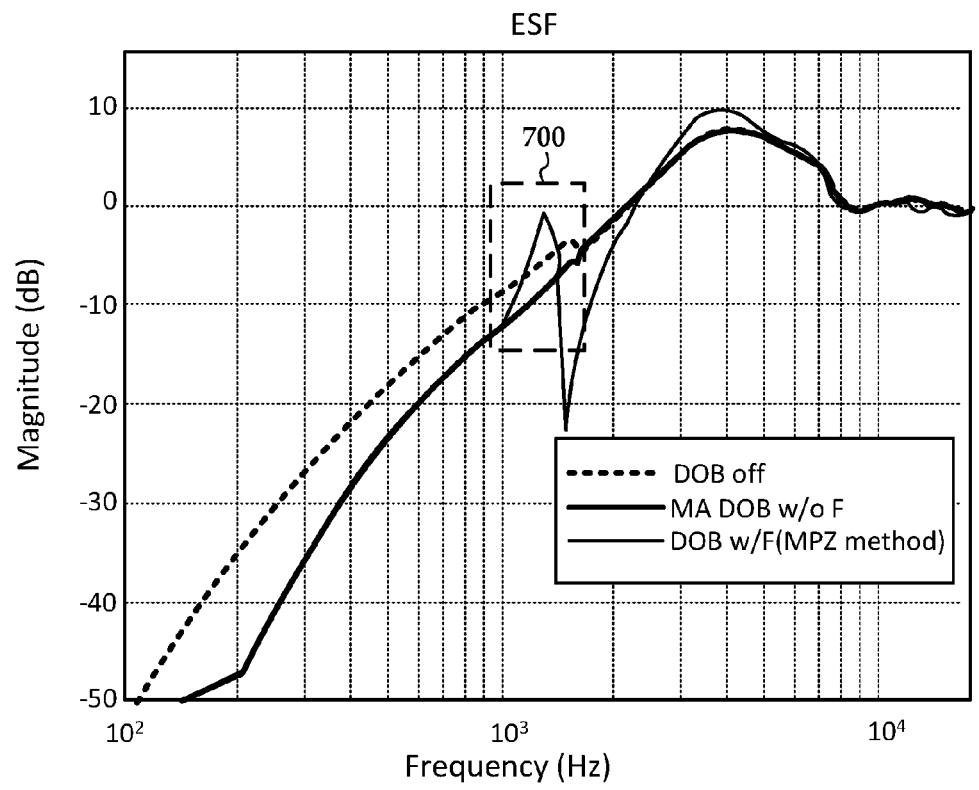
FIG. 7 is a magnitude plot illustrating performance of a servo control system according to another example embodiment.

In the previous example, the first plant 104 was designated as the microactuator and the second plant 105 was designated as the VCM. The inverse is possible, namely that the first plant 104 is the VCM and the second plant 105 is the microactuator. In such a case, is the estimated second plant 105 output 116 is the microactuator output decoupled from the estimated VCM output 115. In FIG. 7, a magnitude plot shows performance of a microactuator disturbance observer. In this case, the Q-filter is a first-order, low-pass filter with a cut-off at 600 Hz. The notch filter has bandwidth of 50, center frequency of 1500 Hz, and depth of 15. As indicated by region 700, the filter design (which is sometimes referred to as matched pole zero, or MPZ) can result in unwanted boosting, also known as the "waterbed effect."

In the discussion below, an alternate filter design is described that can minimize this boosting.

Figure 8:
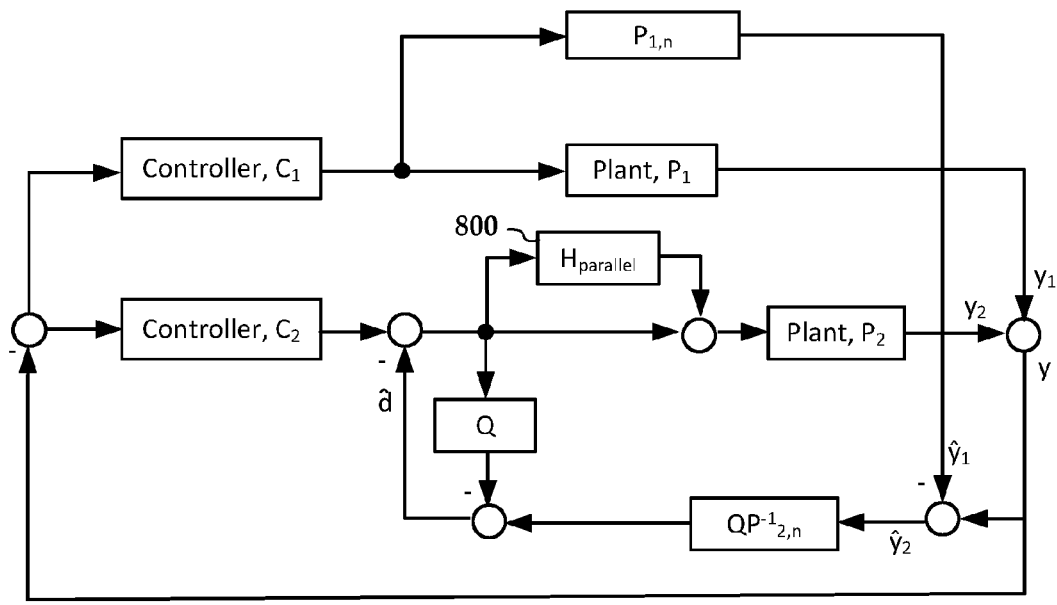
FIG. 8 is a block diagram of a servo control system according to another example embodiment.

Generally, the alternate filter design involves rearranging the servo loop as shown in FIG. 8. For purposes of brevity, the components shown in FIG. 8 are analogous to those described in FIG. 1 unless otherwise indicated. Instead of an inline filter, a parallel peak (or anti-notch) filter 800, $H_{parallel}$(z), is used as a feedback connection of an equivalent plant $\tilde{P}$(z). The parallel filter 800 is defined as $H_{parallel}$(z)=$F^{-1}$(z)−1. The departure angle of the filter poles is determined and a zero is evaluated based on the root locus method. Through the geometric relation between a zero and the poles, parameters are obtained which results in an optimal zero.

Figure 9:
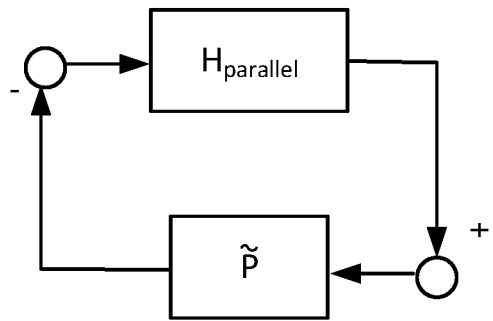
FIG. 9 is a block diagram illustrating a parallel filter according to an example embodiment.

The error sensitivity of the feedback loop with a disturbance observer is given in Expression [7] below, wherein $C_{DOB}$ is given in Expression [8]. The sensitivity S can be decomposed as in Expressions [9]-[12]. These equations show that the sensitivity loop $S_O$ can be shaped by designing $S_H$, which is the sensitivity function for an equivalent plant $\tilde{P}$ and H. This is illustrated schematically in FIG. 9.

$$S = \frac{1}{1 + P_1C_1 + P_2C_{DOB}F^{-1}} = \frac{1}{1 + P_1C_1 + P_2C_{DOB}(1 + H_{parallel})} \quad [7]$$

$$C_{DOB} = \frac{C_2 + QP_{2,n}^{-1}(1 + C_1P_{1,n})}{1 - Q} \quad [8]$$

$$S = S_O S_H \quad [9]$$

$$S_O = \frac{1}{1 + P_1C_1 + P_2C_{DOB}} \quad [10]$$

$$S_H = \frac{1}{1 + \tilde{P}H_{parallel}} \quad [11]$$

$$\tilde{P} = \frac{P_2C_{DOB}}{1 + P_1C_1 + P_2C_{DOB}} \quad [12]$$

Unwanted distortion of the feedback loop shape is achieved by choosing the filter zero $z_0$ such that, in the root locus for the system, the open loop poles associated with $H_{parallel}$ have an optimal angle of departure. The compensator has the form shown in Equation [13] below, where $k_0$ is a filter gain and $z_{opt}$ is an optimal zero which determines gain and zero of the filter. The damping factor $\eta \epsilon (0,1)$ characterizes the shape of the peak and $\theta(=\omega_0 T_s = 2\pi f_0 T_s)$ represents the center frequency at $f_0$ where $T_s$ is the sampling period. The optimal zero is obtained as shown in Equation [14].

$$H_{parallel}(z) = \frac{k_0(z - z_{opt})}{z^2 - 2\eta\cos\theta z + \eta^2} \quad [13]$$

$$z_{opt} = \eta[\cos\theta - \sin\theta \tan(\angle \tilde{P}(\eta e^{j\theta}) - \theta)] \quad [14]$$

The following is a brief summary of the proof for Equations [13] and [14] above. First, the root locus method as shown in Equation [15] is applied into the loop $\tilde{P}(z)H_{parallel}$(z), which results in Equation [16] below, where $z_i$ and $p_i$ are zeroes and poles, respectively.

$$\sum_{i=1}^{m} \angle(z - z_i) - \sum_{i=1}^{n} \angle(z - p_i) = \pi \times l, \; l = \pm 1, \pm 3, \pm 5, \ldots, \quad [15]$$

$$\angle k_0(p_1 - z_{opt}) - [\angle(z - p_1)\angle(p_1 - p_2)] + \angle\tilde{P}(p_1) = \pi \quad [16]$$

By the geometry, Equations [17]-[19] can be deduced. With the help of Equation [18], the geometric relation between the poles can be obtained as shown in Equation [20], which results in Equation [21], which is equivalent to Equation [14], thus completing the proof $$\psi - \theta + \angle \tilde{P}(\eta e^{j\theta}) = \frac{\pi}{2} \quad [17]$$

$$\psi + \phi = \frac{\pi}{2} \quad [18]$$

$$\psi := \angle(\eta e^{j\theta} - z_{opt}) \in (0, \pi), \phi := \angle \tilde{P}(\eta e^{j\theta}) - \theta \quad [19]$$

$$(\eta \cos\theta - z_{opt}) \tan\psi = \eta \sin\theta \quad [20]$$

$$z_{opt} = \eta[\cos\theta - \sin\theta \cot\psi] = [\cos\theta - \sin\theta \tan\phi] \quad [21]$$

Figure 10:
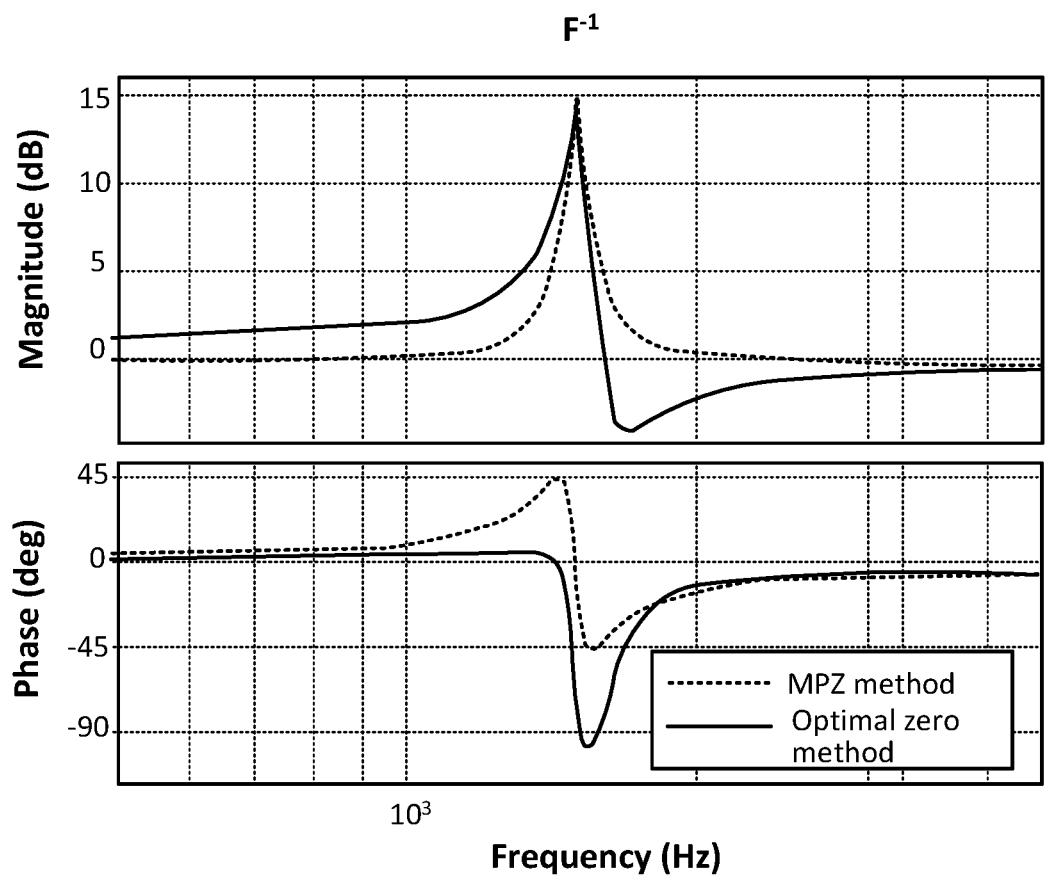
FIG. 10 is a Bode plot illustrating performance of a peak filter according to another example embodiment.
Figure 11:
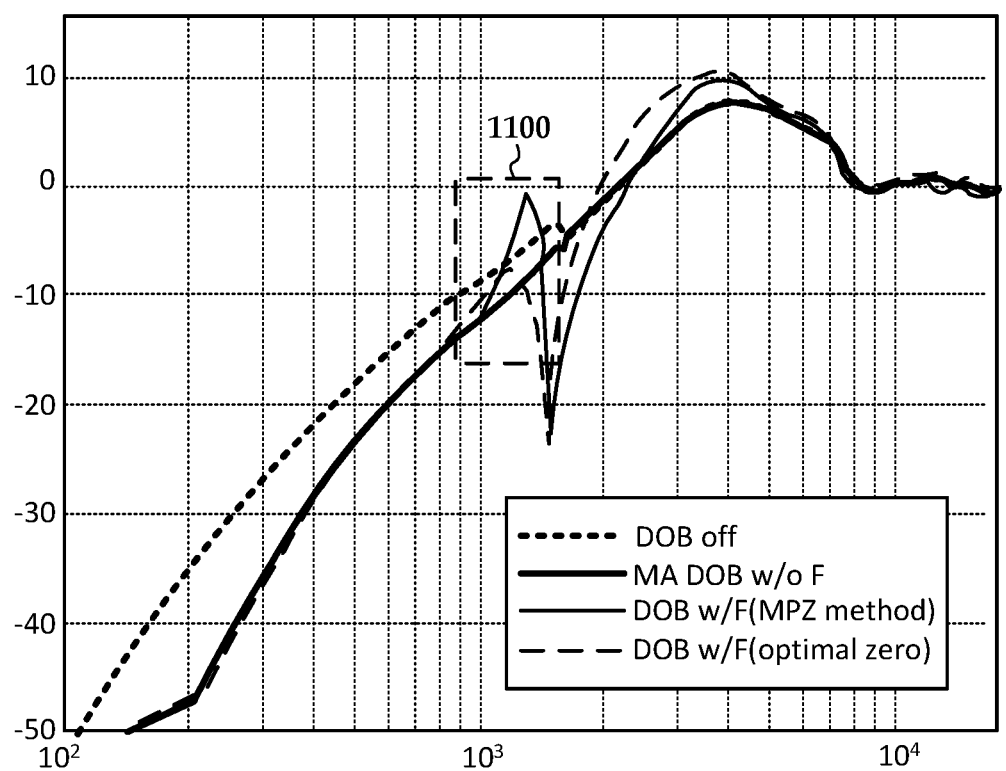
FIG. 11 is a magnitude plot illustrating performance of a servo control system according to another example embodiment.

In FIG. 10, a bode plot shows the difference between the 1.5 kHz filter developed using the MPZ method and the optimal zero method described above. Note the asymmetric shape of the filter response in both the magnitude and phase plots. In FIG. 11, an ESF plot shows the performance with the optimal zero filter overlaid with the responses previously shown in FIG. 7. Note the reduction in boosting in region 1100 for the optimal zero filter.

Figure 12:
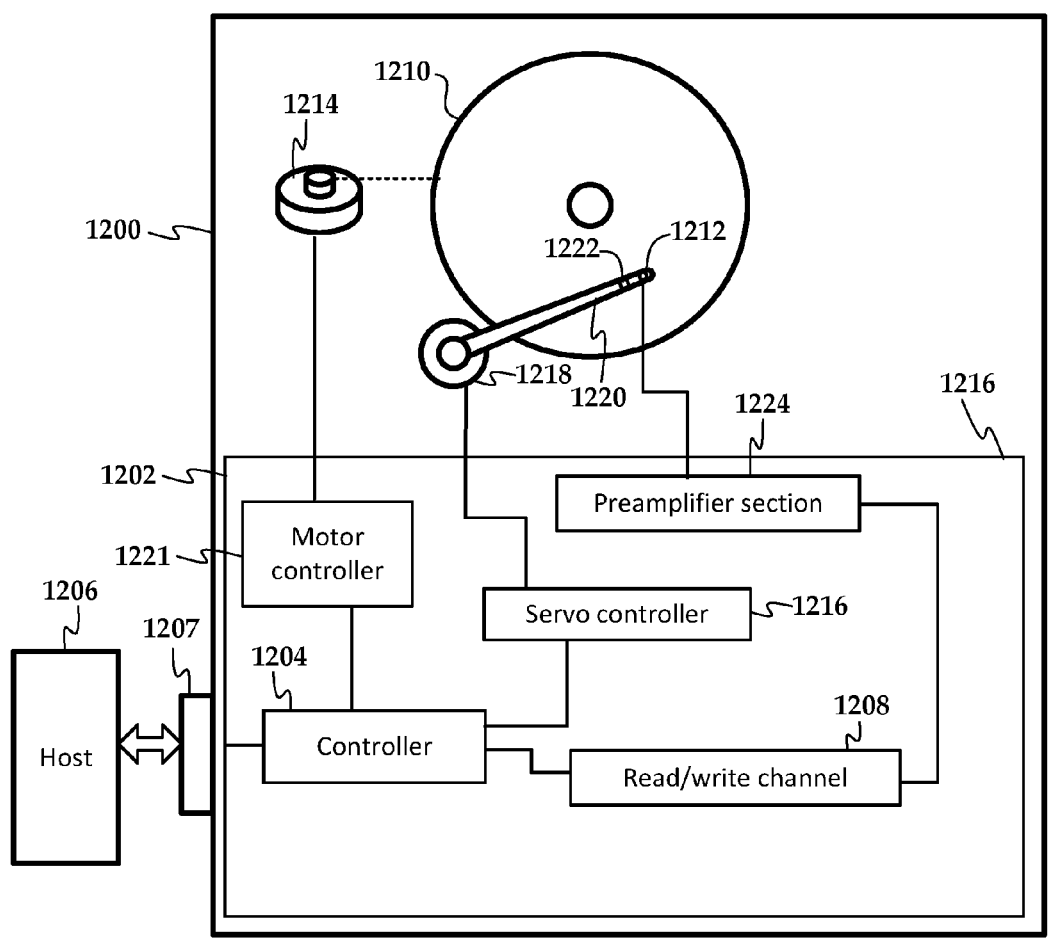
FIG. 12 is a block diagram of an apparatus according to an example embodiment.

In reference now to FIG. 12, a block diagram illustrates components of a hard drive apparatus 1200 according to an example embodiment. The apparatus 1200 includes circuitry 1202 that facilitates reading from and writing to a recording medium, e.g., one or more magnetic disks 1210. The circuitry 1202 includes a system controller 1204 that facilitates, among other things, communication with a host device 1206 via a host interface 1207. The host device 1206 may include any electronic device that can be communicatively coupled to communicate with the circuitry 1202, e.g., a general-purpose computer, a factory test bench, etc.

The system controller 1204 may include any combination of custom logic circuits, application specific integrated circuits (ASICs), general-purpose central processing unit (CPU), interface circuits, and may utilize instructions stored as firmware and/or software. The system controller 1204 communicates with one or more read/write heads 1212 via a read/write channel 1208. The system controller 1204 may, among other things, determine a location on the disk 1210 for data to be stored or retrieved, move the read/write head 1212 to the locations (tracks) on the disk 1210, read or write the data via the read/write channel 1208, correct errors, transfer the data to/from the host 1206, etc.

The read/write channel 1208 converts data between the digital signals processed by the system controller 1204 and the analog signals conducted through read/write head 1212. The read/write channels 1208 also provide servo data read from the disk(s) 1210 to servo controller 1216. The servo controller 1216 use these signals to drive a VCM actuator 1218 that rotates an arm 1220 upon which the read/write head 1212 is mounted. The head 1212 is moved radially across different tracks of the disk 1210 by the VCM actuator 1218 while a spindle motor 1214 rotates the disk 1210. The controller 1204 controls the spindle motor 1214 by way of a motor controller 1221.

The servo controllers 1216 also control a microactuator 1222 that provides fine position control for the read/write head 1212. The microactuator 1222 may formed from, e.g., piezoelectric materials, and may be mounted on the arms 1222 proximate the read/write heads 1212. The servo controller 1216 uses a dual-stage, closed loop controller with a decoupled disturbance observer as described above. A notch filter is used after the disturbance compensation to provide rejection of disturbances at frequencies that may not be handled by the disturbance observer.

During write operations, the read/write channel 1208 provides analog signals that are delivered to the read/write head 1212 by way of a preamplifier section 1224. The preamplifier section 1224 amplifies and conditions the write signals sent to a write coil of the read/write head 1212. During read operations, the read/write head 1212 transmits signals to the preamplifier section 1224, which conditions the analog signals before sending the signals to the read/write channel 1208.

Figure 13:
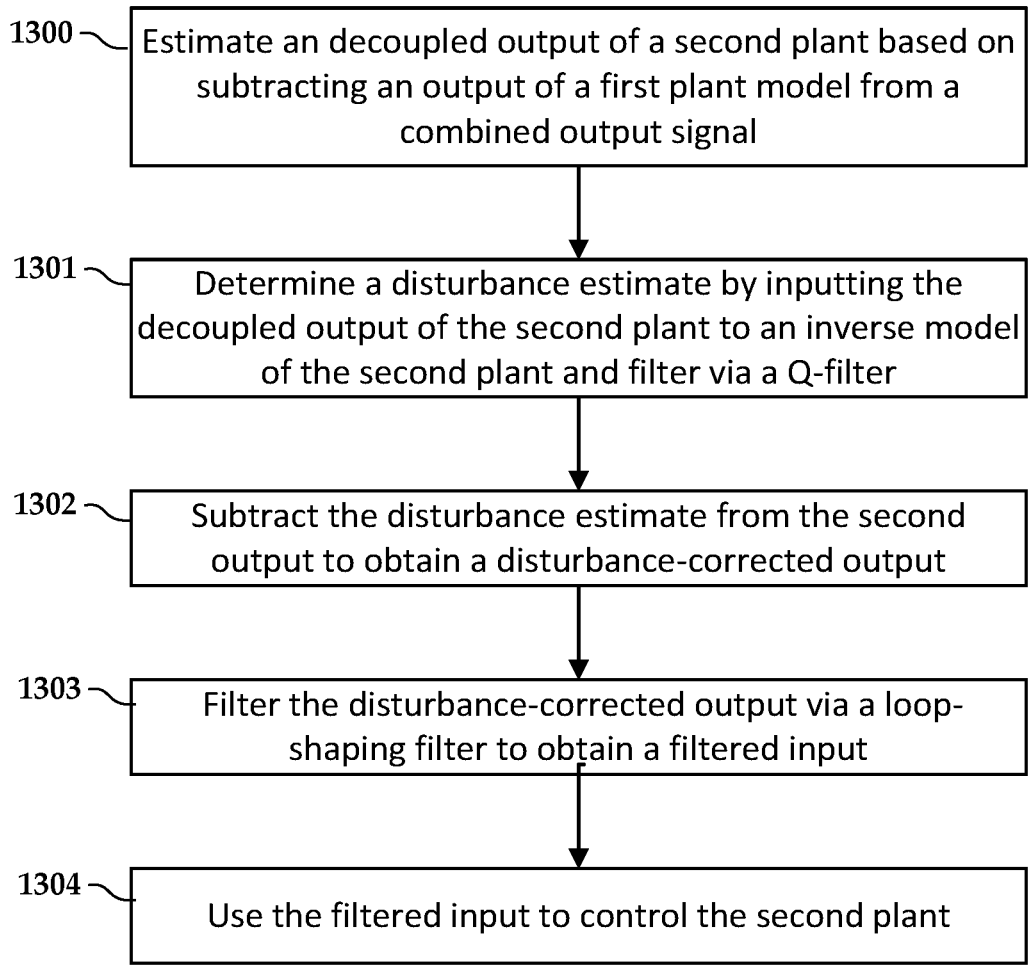
FIG. 13 is a flowchart showing a method according to an example embodiment.

In FIG. 13, a flowchart illustrates a method according to an example embodiment. The method can be used in a hard disk servo control system with first and second stages that provide a combined output that positions a read/write head in response to respective first and second outputs from respective first and second controllers. The method involves estimating 1300 a decoupled output of a second plant based on subtracting an output of a model of a first plant from the combined output signal. The first and second plants correspond to the first and second stages of the servo system. A disturbance estimate is determined 1301 based on the decoupled output of the second plant being input to an inverse model of the second plant and filtered via a Q-filter. The disturbance estimate is subtracted 1302 from the second output to obtain a disturbance-corrected output. The disturbance-corrected output is filtered 1303 via a loop-shaping filter to obtain a filtered input. The filtered input is used 1304 to control the second plant.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
   in a hard disk servo control system comprising first and second stages that provide a combined output that positions a read/write head in response to respective first and second outputs from respective first and second controllers:
   estimating an decoupled output of a second plant based on subtracting an output of a model of a first plant from the combined output signal, the first and second plants corresponding to the first and second stages;
   subtracting a disturbance estimate from the second output to obtain a disturbance-corrected output, the disturbance estimate based on the decoupled output of the second plant being input to an inverse model of the second plant and filtered via a Q-filter; and
   filtering the disturbance-corrected output via a loop-shaping filter to obtain a filtered input; and
   using the filtered input to control the second plant.

2. The method of claim 1, wherein the first plant corresponds to a microactuator and the second plant comprises a voice coil motor.

3. The method of claim 1, wherein the first plant corresponds to a voice coil motor and the second plant comprises a microactuator.

4. The method of claim 1, wherein the loop-shaping filter comprises a higher center frequency than a cut-off frequency of the Q-filter.

5. The method of to claim 1, wherein the loop-shaping filter comprises a peak filter in series between the second controller and the second plant.

6. The method of claim 5, wherein the peak filter comprises a matched pole zero filter.

7. The method of claim 1, wherein the loop-shaping filter comprises a peak filter in parallel to the disturbance-corrected output and used as a feedback connection to an equivalent plant.

8. The method of claim 7, wherein the peak filter has a zero such that, in a root locus for the filter, open loop poles associated with the filter have an optimum angle of departure.

9. The method of claim 7, wherein the peak filter is asymmetric about a center frequency.

10. An apparatus comprising:
    a read/write channel configured to communicate with a dual-stage actuator that positions a read/write head, the dual-stage actuator modeled as first and second plants; and
    a servo controller coupled to the read/write channel, the servo controller comprising:
    first and second controllers that output respective first and second control signals for the first and second plants;
    an inverse model of the first plant used to determine a decoupled output of the second plant from a combined output of the first and second plants;

an inverse model of the second plant coupled to a Q-filter and used to form disturbance estimate, the disturbance estimate subtracted from the second control signal to obtain a disturbance-corrected output; and a loop-shaping filter between the disturbance corrected output and the second plant.

11. The apparatus of claim 10, wherein the first plant corresponds to a microactuator and the second plant corresponds to a voice coil motor.

12. The apparatus of claim 10, wherein the first plant corresponds to a voice coil motor and the second plant corresponds to a microactuator.

13. The apparatus of claim 10, wherein the loop-shaping filter comprises a higher center frequency than a cut-off frequency of the Q-filter.

14. The apparatus of claim 10, wherein the loop-shaping filter comprises a peak filter in series between the second controller and the second plant.

15. The apparatus of claim 14, wherein the peak filter comprises a matched pole zero filter.

16. The apparatus of claim 10, wherein the loop-shaping filter comprises a peak filter in parallel to the disturbance-corrected output and used as a feedback connection to an equivalent plant.

17. The apparatus of claim 16, wherein the peak filter has a zero such that, in a root locus for the filter, open loop poles associated with the filter have an optimum angle of departure.

18. A system comprising:

an actuator that positions a read/write head, the actuator comprising stages that include, in any order, a microactuator and a voice coil motor; and a servo controller coupled to the dual-stage actuator, the servo controller comprising:

first and second controllers that output respective first and second control signals for first and second plants that respectively correspond to the stages of the actuator;

an inverse model of the first plant used to determine a decoupled output of the second plant from a combined output of the first and second plants;

an inverse model of the second plant coupled to a Q-filter and used to form disturbance estimate, the disturbance estimate subtracted from the second control signal to obtain a disturbance-corrected output; and a loop-shaping filter between the disturbance corrected output and the second plant.

19. The system of claim 18, wherein the loop-shaping filter comprises a matched pole zero peak filter in series between the second controller and the second plant.

20. The system of claim 18, wherein the loop-shaping filter comprises a parallel peak filter used as a feedback connection to an equivalent plant, the peak filter being asymmetric about a center frequency.

* * * * *